(12) United States Patent
Dahms et al.

(10) Patent No.: US 8,055,096 B2
(45) Date of Patent: Nov. 8, 2011

(54) METHOD AND SYSTEM FOR INCREMENTAL PATCHING OF BINARY FILES

(75) Inventors: John F. A. Dahms, Waterloo (CA); Anthony F. Scian, Waterloo (CA)

(73) Assignee: Research In Motion Limited, Waterloo (CA)

( * ) Notice: Subject to any disclaimer, the term of this patent is extended or adjusted under 35 U.S.C. 154(b) by 1017 days.

(21) Appl. No.: 11/430,884

(22) Filed: May 10, 2006

(65) Prior Publication Data

US 2007/0274598 A1 Nov. 29, 2007

(51) Int. Cl.
*G06K 9/36* (2006.01)
(52) U.S. Cl. ........ 382/282; 382/305; 717/120; 717/168; 717/173; 717/170; 707/693; 707/752
(58) Field of Classification Search .................. 382/305, 382/282; 707/203, 693, 752; 717/120, 168, 717/170, 173
See application file for complete search history.

(56) References Cited

U.S. PATENT DOCUMENTS

| | | | |
|---|---|---|---|
| 5,745,906 A | 4/1998 | Squibb | |
| 5,832,520 A * | 11/1998 | Miller | 1/1 |
| 6,018,747 A * | 1/2000 | Burns et al. | 1/1 |
| 6,052,531 A * | 4/2000 | Waldin et al. | 717/170 |
| 6,161,218 A * | 12/2000 | Taylor | 717/174 |
| 6,167,407 A * | 12/2000 | Nachenberg et al. | 1/1 |
| 6,348,749 B1 * | 2/2002 | Ueyama | 310/90.5 |
| 6,349,311 B1 * | 2/2002 | Sobel et al. | 707/625 |
| 6,438,749 B1 | 8/2002 | Chamberlain | |
| 6,526,574 B1 * | 2/2003 | Jones | 717/168 |
| 6,775,423 B2 * | 8/2004 | Kulkarni et al. | 382/305 |
| 6,850,964 B1 * | 2/2005 | Brough et al. | 709/203 |
| 7,080,051 B1 * | 7/2006 | Crawford | 705/400 |
| 7,117,494 B2 * | 10/2006 | Rajaram | 717/174 |
| 7,149,508 B2 * | 12/2006 | Herle | 455/418 |
| 7,392,260 B2 * | 6/2008 | Ren et al. | 707/752 |
| 7,492,953 B2 * | 2/2009 | Anderson et al. | 382/235 |
| 7,865,479 B2 * | 1/2011 | Gu et al. | 707/693 |
| 2002/0016956 A1 * | 2/2002 | Fawcett | 717/11 |
| 2002/0034105 A1 * | 3/2002 | Kulkarni et al. | 365/200 |
| 2002/0065799 A1 * | 5/2002 | West et al. | 707/1 |
| 2004/0034849 A1 * | 2/2004 | Cohen et al. | 717/120 |

(Continued)

FOREIGN PATENT DOCUMENTS

EP  1855197 A1 * 11/2007

(Continued)

OTHER PUBLICATIONS

Naive Differences—Code, Colin Percival, Computing Lab Oxford University, 2003, pp. 1-3.*

(Continued)

*Primary Examiner* — Jayesh A Patel
(74) *Attorney, Agent, or Firm* — Ridout & Maybee LLP

(57) ABSTRACT

An incremental patch is generated as a set of delta files or sector-specific patches, intended to be applied incrementally to an old binary image. Each sector-sized patch takes into account changes to the binary image made by previous patches in the series, such that cyclic dependencies are eliminated. The sector-sized patches are generated by applying a binary difference algorithm to the then-current partially patched image, until each sector has a corresponding delta file. The order for patching sectors may be determined by selecting sectors for patching based on first overwriting those sectors making the least contribution of data to generation of the new binary image.

24 Claims, 8 Drawing Sheets

U.S. PATENT DOCUMENTS

| | | | |
|---|---|---|---|
| 2004/0088694 A1* | 5/2004 | Ho | 717/170 |
| 2004/0098420 A1* | 5/2004 | Peng | 707/203 |
| 2004/0098427 A1* | 5/2004 | Peng | 707/205 |
| 2004/0107416 A1* | 6/2004 | Buban et al. | 717/170 |
| 2004/0145661 A1* | 7/2004 | Murakami et al. | 348/222.1 |
| 2004/0261073 A1* | 12/2004 | Herle et al. | 717/173 |
| 2005/0010576 A1* | 1/2005 | Ren et al. | 707/100 |
| 2005/0021572 A1* | 1/2005 | Ren et al. | 707/203 |
| 2005/0234997 A1* | 10/2005 | Gu et al. | 707/104.1 |
| 2006/0112152 A1* | 5/2006 | Napier et al. | 707/203 |

FOREIGN PATENT DOCUMENTS

| | | |
|---|---|---|
| EP | 1855197 | 2/2010 |
| WO | WO2004/114130 | 12/2004 |
| WO | WO2005/101200 | 10/2005 |

OTHER PUBLICATIONS

An automated—FreeBSD, Colin Percival, Computing Lab Oxford University, Sep. 2003, pp. 1-8.*

C. Percival, Naive Differences of Executable Code, http://www.daemonology.net/bsdiff/ (2003).

C. Percival, An Automated Binary Security Update System for FreeBSD, Proceedings of BSDCon '03, Sep. 2003.

* cited by examiner

METHOD AND SYSTEM FOR INCREMENTAL PATCHING OF BINARY FILES

FIELD

The present application relates to methods for performing software updates and, in particular, performing incremental patching of binary files.

BACKGROUND

A common practice in the computer software industry is to update binary code by way of a patch. Application of a patch to existing binary code results in updated binary code. In its simplest form, a patch is a set of commands for creating the updated binary code using the existing binary code. For example, the patch may include a set of copy and insert commands. A copy command includes a reference to a section of the existing binary code that matches a section of the updated binary code. The copy command is useful when a portion of the updated binary code can be obtained from the existing binary code. An insert command provides data to be inserted in the updated binary code. The insert command is used to create portions of the updated binary code that cannot be found in the existing binary code.

In practice, the "copy" command in a patch rarely involves copying an exact portion of the existing binary code for inclusion in the updated binary code. Usually, the "copied" portion of the existing binary code is similar, but not exactly the same, as the desired portion of updated binary code. Accordingly, the patch may also include an associated difference file. The copy command is used to indicate that a portion of the updated binary code is similar to the existing binary code, and the associated difference file contains the byte-wise differences. Each copy command may specify an offset in the existing binary code and a length. The specified portion of the existing binary code is read and added to the same number of bytes from the associated difference file to create the desired portion of the updated binary code.

The conventional method of patching a binary image is to create a backup of the old image, generate a new image by applying the patch to the old image, and then overwrite the old image with the newly generated image once it has been completed. This approach requires a substantial amount of free memory space, which may not be available In memory-scarce environments, such as mobile electronic devices.

One option for conserving memory space is to apply the patch incrementally to the existing binary image in memory, overwriting portions of the image as the patch executes. This option can produce viable patches but the incremental overwriting of the old portions of the image can result in a patch that must inject (rather than copy) substantial portions of the new image. Because the patch is implemented incrementally, the old image is incrementally overwritten, meaning that old sections of the image are not available for copying into the new image. The reduced amount of data available for copying may result in a larger patch.

Accordingly, it would be advantageous to provide a method and system for generating an incremental patch that improves the amount of reuse of data that will be available during the patching process. It would also be advantageous to provide a method and device for incrementally patching a binary image.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Figure 1:
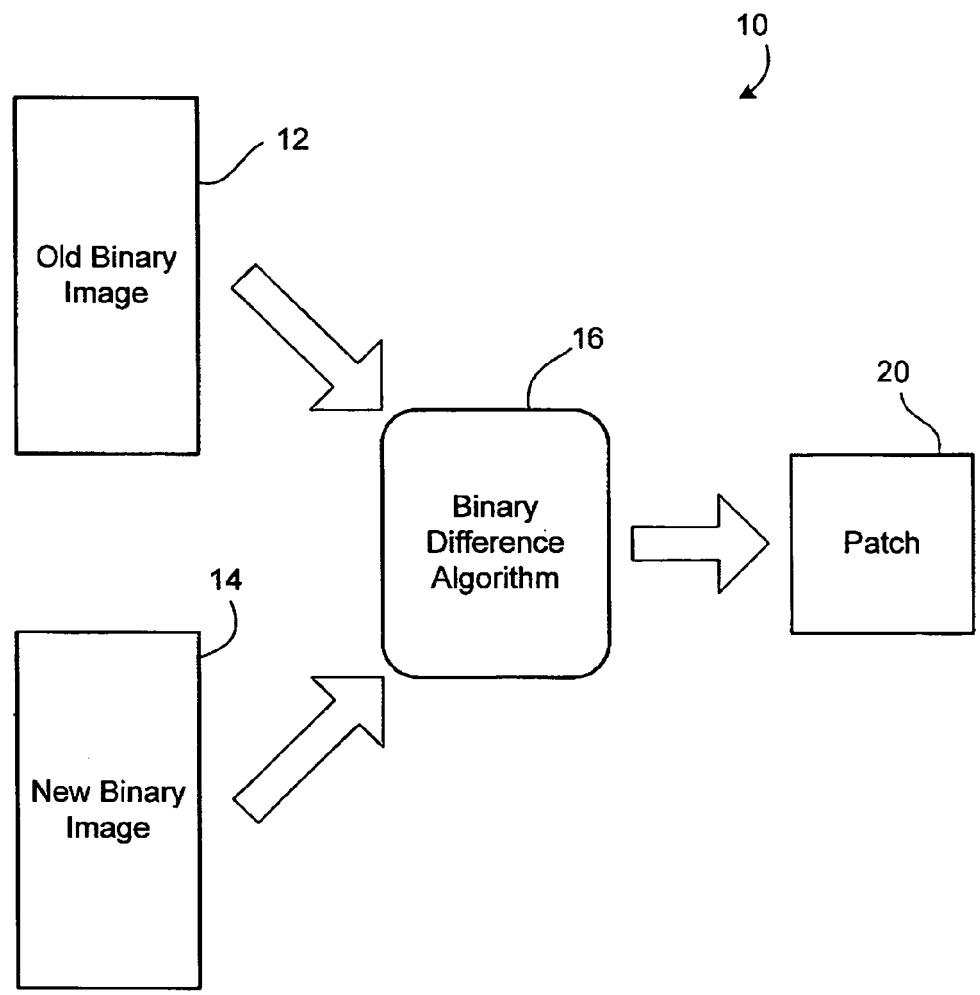
FIG. 1 shows a block diagram of a known method of producing a patch for generating a new binary image from an old binary image.

The present application describes and discloses a method, system, and machine-readable medium for generating an incremental patch to update an old binary image. The present application further describes and discloses a method, mobile electronic device and machine-readable medium for incrementally patching an old binary image to create a new binary image.

An incremental patch is generated as a series of delta files or sector-specific patches, intended to be applied incrementally to the old binary image. Each sector-specific patch contains the commands for generating one sector of a new binary image. Each sector-specific patch takes into account changes to the binary image made by previous patches in the series since the image memory will contain a mixture of the old image and the new image at each incremental step of the patch process. The observation that the current image will often have useful information that can be referenced by a binary patch allows this method to produce smaller patches than systems that only refer to the old image. The sector-specific patches are generated by applying a binary difference algorithm to the then-current partially patched image, until each sector has a corresponding delta file.

In some embodiments, the sector-specific patches may be generated in an order that takes into account the relative contributions of the sectors to generating the new binary image. In particular, the order in which sectors are patched may be based on first overwriting those sectors making the least contribution of data to generation of the new binary image.

In one aspect, the present application provides a method of generating an incremental patch for updating an old binary image to a new binary image. The new binary image is divided into a plurality of sectors. The method includes the steps of initially establishing a current image as the old binary image, selecting one of the plurality of sectors, computing a delta file for obtaining data for one of the plurality of sectors from the current image, applying the delta file to the current image to update the current image, and repeating the steps of computing and applying for each of the plurality of sectors. The incremental patch is the plurality of delta files created from the computing steps.

In another aspect, the present application provides a system for generating an incremental patch for updating an old binary image to a new binary image. The new binary image is divided into a plurality of sectors. The system includes memory for storing the new binary image and the old binary image, and for storing a current image, wherein the current image is initially established as the old binary image. It also includes a processor and a patch generation module executable by the processor for generating the incremental patch. The patch generation module includes a component for computing a delta file for obtaining data for one of the plurality of sectors from the current image, and a component for applying the delta file to the current image to update the current image. The patch generation module also includes a loop component for invoking the component for computing and the component for applying for each of the plurality of sectors. The incremental patch is the plurality of the delta files created by the component for computing under control of the loop component.

The present application also provides a machine-readable medium storing program instructions for executing any of the methods described herein within any of the system or devices described herein, as the case may be.

Embodiments of the present application are not limited to any particular operating system, mobile device architecture, server architecture, or computer programming language.

References in the present application to "blocks" or "sectors" of an image or of memory are intended to refer to portions or blocks of memory space having a predefined size. In the case of flash memory, or other similar types of writable memory, a block or sector refers to that sub-portion of the memory that can be written at one time.

While the present application describes embodiments that are of use in patching code resident in flash memory, the present application is not limited to patching binary data in flash memory and may be implemented in connection with other types of memory. It will also be understood that, although the present application provides some examples of methods for choosing the permutation of sectors to use in generating the incremental patches, the present application is not limited to these methods.

Reference is first made to FIG. 1, which shows a block diagram of a known method 10 of producing a patch 20 for generating a new binary image 14 from an old binary image 12. A binary difference algorithm 16 is used to produce the patch 20 based upon the old binary image 12. The patch 20 is a difference file that describes how to obtain the new binary image 14 from the old binary image 12. The difference file may reference portions of the old binary image 12 for inclusion in the new binary image 14. It may also include new binary data for inclusion in the new binary image 14, where corresponding data cannot be efficiently referenced from the old binary image 14. In some embodiments, the patch 20 may include a set of copy and insert commands, wherein the copy commands reference portions of the old binary image to be copied into the new binary image, and the insert commands contain new data for insertion into the new binary image.

Updating binary images, and in particular executable software code, using a patch is a well-known technique in the computer programming industry. A variety of binary difference algorithms exist and would be well known to those of ordinary skill in that art.

In some cases, patches are used to update a large block of executable code. For example, the patch may be intended to update the executable code resident on a mobile electronic device, such as a personal digital assistant (PDA). The conventional method of using a patch involves creating a backup copy of the old binary image, generating the new binary image by applying the patch to the old binary image, and then replacing the old binary image with the new binary image. It will be appreciated that this process may require a large amount of memory to implement. For example, if the old binary image is 3 MB, then the backup of this image necessitates a further 3 MB, and the generation of the new image necessitates the availability of about 3 MB. In all, 6-7 MB of free memory space may be necessary to facilitate use of the patch. This amount of free memory may not be available on a memory-scarce device, like a PDA.

Another issue that arises with respect to patching a binary image stored in flash memory is the fact that flash memory can only be written in defined blocks or sectors of a predetermined size.

U.S. Pat. No. 6,775,423 to Kulkarni et al, issued Aug. 10, 2004, describes a binary difference algorithm that attempts to create a patch designed to incrementally update an image stored In flash memory a block at a time. Kulkarni et al. recognizes that portions of the patch may rely upon portions of the old image that are written over as the incremental patching is performed, which results in a cyclic dependency. The Kulkarni patent attempts to address this problem by proposing that portions of the patch be reorganized in order to eliminate cyclic dependencies.

The present application describes novel methods of generating an Incremental patch, wherein the incremental patch is a set of patches intended to be applied in sequence to the existing binary image.

Figure 2:
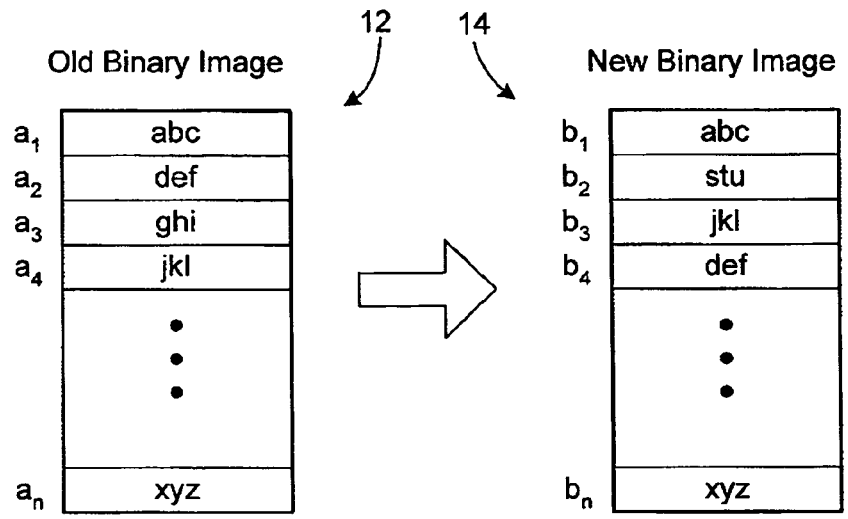
FIG. 2 diagrammatically shows the old binary image and the new binary image.

Reference is now made to FIG. 2, which diagrammatically shows the old binary image 12 and the new binary image 14. The old binary image 12 is contained in n sectors labeled individually $a_1$ to $a_n$. Sector $a_1$, for example, contains binary data "abc". The new binary image 14 is contained in n sectors labeled individually $b_1$ to $b_n$. Sector $b_1$, for example, also contains binary data "abc".

In this embodiment, the old binary image 12 and the new binary image 14 occupy the same n number of sectors; however, in many embodiments the new binary image 14 may occupy more sectors than the old binary image 12. In some embodiments, where the old binary image 12 occupies fewer sectors (i.e. m sectors) than the new binary image 14, then the shorter image may be padded with (n-m) uninitialized sectors so that both images have n sectors. Those skilled in the art will appreciate that the padding of the shorter Image (with 00's or ff's) will not materially affect the operation of the methods described herein. In cases where the old binary image 12 occupies more sectors than the new binary image 14, the extra sectors will be used as input for the incremental patches but they will not necessarily be patched to form part of the new image. The removal of these extra sectors can be deduced by the patch method once the patching of the new image is finished.

A patch for generating the new binary image 14 from the old binary image 12 may contain references to portions of the old binary image 12 and sections of new data. In other words, the patch may contain copy commands that reference portions of the old binary image 12 and insert commands for inserting new data. As noted above, a patch operation performed on code stored in flash memory may be executed on a sector-by-sector basis. Referring still to FIG. 2 as an example, a patch may include a command to create sector $b_1$ by copying sector $a_1$ since sector $a_1$ contains the same data, "abc", as sector $b_1$. Similarly, the patch may include a command to copy sector $a_2$ in order to create sector $b_4$, since it contains data "def". Sector $b_2$ contains new data that cannot be obtained from the old binary image 12, so the patch may contain an insert command and the data "stu".

The order in which sector-specific patches are applied can raise a problem. This problem will now be illustrated by way of a simplified example. When patching a binary image in flash memory, especially on a device with limited memory capacity, like a mobile electronic device, the patch may be applied by overwriting the memory sectors containing the old binary image 12 with data to create the new binary image 14. Referring to the example shown in FIG. 2, when the patch is applied in order to update the old binary image 12 the patch may begin by writing sector $b_1$ with data "abc" based on the reference to sector $a_1$. It may then write sector $b_2$ with the data "stu". Sector $b_3$ may then be written with the data "jkl" based on a reference to sector $a_4$. It will be noted that a cyclic dependency problem may be encountered in attempting to patch sector $b_4$ since it depends on a reference to sector $a_2$ in order to obtain the data "def". However, the data in sector $a_2$ was overwritten with the data "stu" in a previous step in the patch operation. Accordingly, the referenced data in the old binary image 12 is no longer available. The patch would therefore need to contain the data "def", which may result in a larger patch.

Figure 3A:
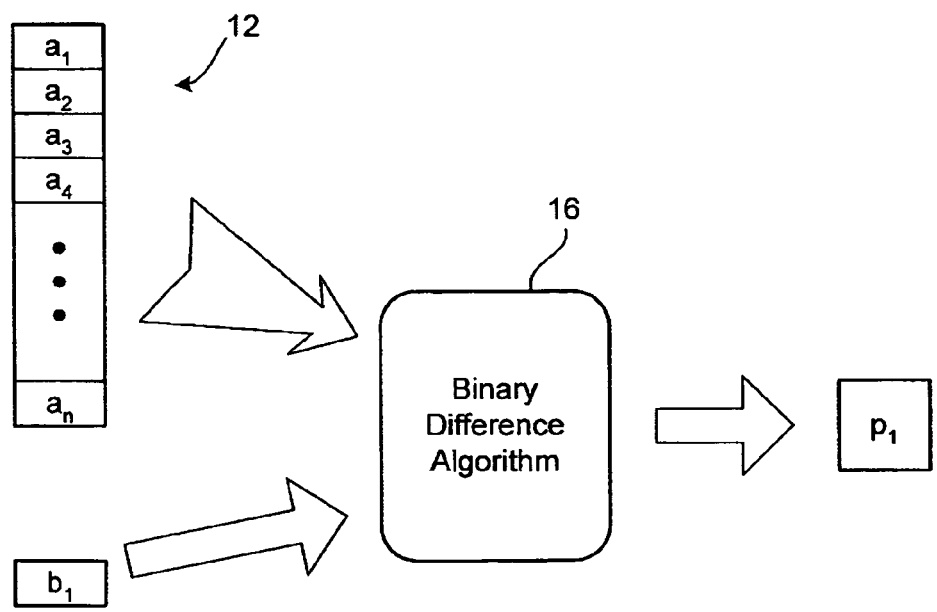
FIGS. 3A-3D illustrate, in block diagram form, the generation of an incremental patch in accordance with an embodiment of the present application.

Reference is now made to FIGS. 3A-3D, which illustrate, in block diagram form, the generation of an incremental patch in accordance with an embodiment of the present application. FIG. 3A shows the generation of a first patch $p_1$ using the binary difference algorithm 16. The binary difference algorithm 16 generates the first patch $P_1$ based upon the old binary image 12 and a first sector $b_1$ of a new binary image. The first patch $p_1$ contains the instructions for obtaining $b_1$ from the old binary image 12. Accordingly, the first patch $p_1$ may contain copy commands that reference portions of the old binary image 12 and may contain insert commands for inserting new data.

Figure 3B:
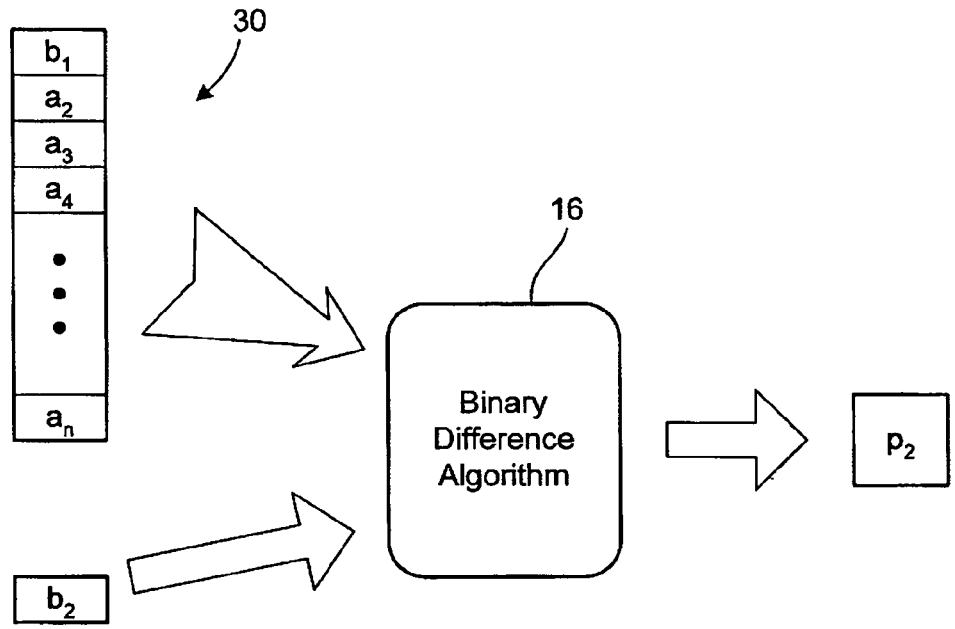

Reference is now made to FIG. 3B, which shows the generation of a second patch $p_2$ using the binary difference algorithm 16. The second patch $p_2$ is generated based upon a second sector $b_2$ of the new binary image and a partially patched image 30. The partially patched image 30 is the old binary image 12 with the previously generated patches applied to it, which in this case Includes only the first patch $p_1$. The partially patched image 30 may be referred to as a "current image" or an "intermediate image". The second patch $p_2$ contains instructions for obtaining the second sector $b_2$ of the new binary image from the partially patched image 30.

Figure 3C:
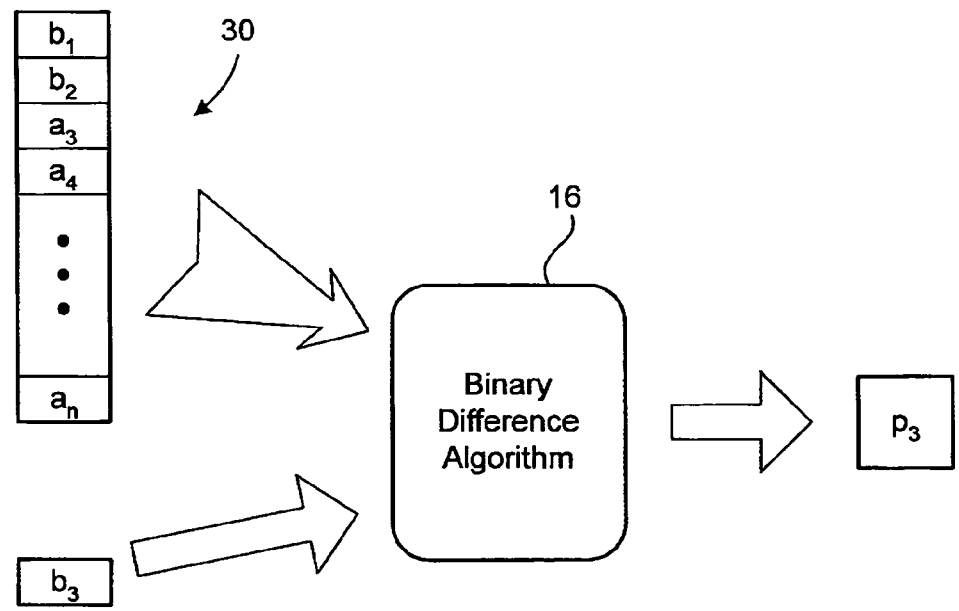

FIG. 3C shows the generation of a third patch $p_3$ using the binary difference algorithm 16. The third patch $p_3$ contains instructions for obtaining a third sector $b_3$ of the new binary image from the partially patched image 30. It will be noted that, at this stage, the partially patched image 30 is obtained from the application of the first patch $p_1$ and the second patch $p_2$ to the old binary image 12. Accordingly, it contains sectors $b_1$ and $b_2$ of the new binary image.

Figure 3D:
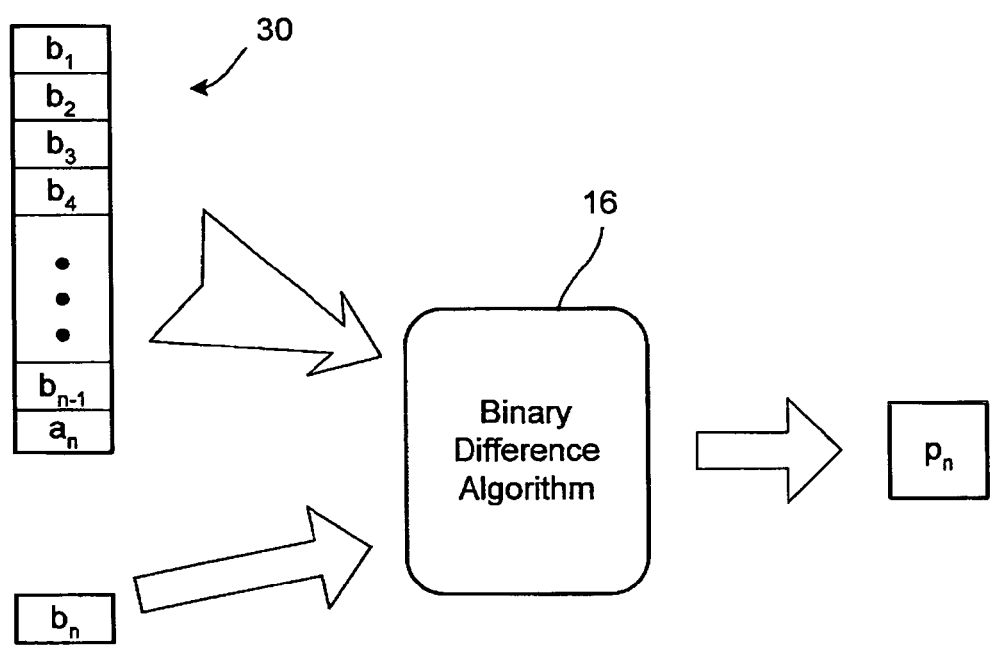

Finally, FIG. 3D shows the generation of the final patch $p_n$ using the binary difference algorithm 16. At this stage the partially patched image 30 includes sectors $b_1$ to $b_{n-1}$ of new binary image data.

The incremental patch comprises the patches $p_1$ to $p_n$. In some cases, the individual sector-based patches $p_1$ to $p_n$ may be referred to as "difference files" or "delta files". It will be appreciated that each sector-specific patch in the series of patches relies upon the then-current partially patched image 30 instead of the original old binary image 12.

Figure 4:
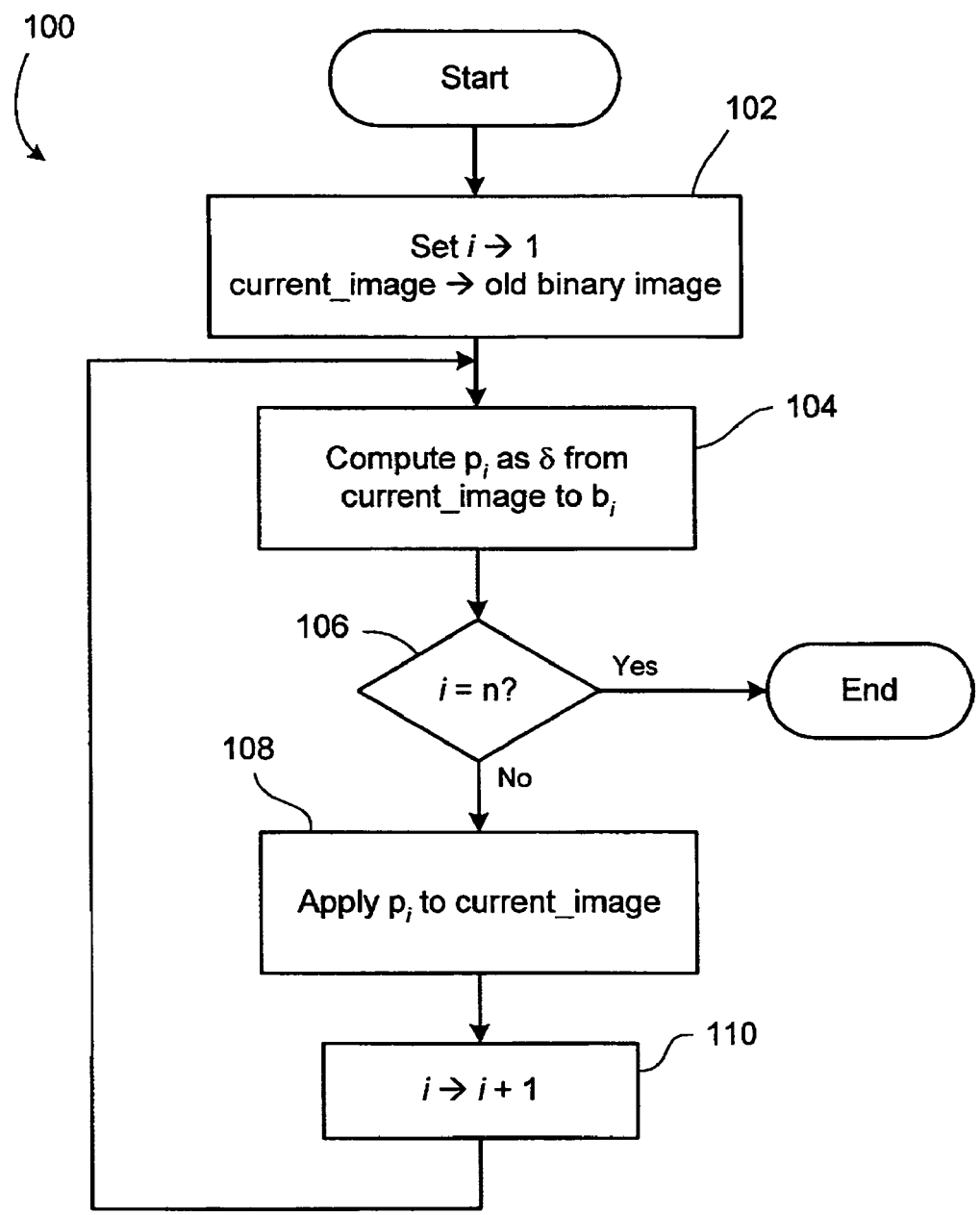
FIG. 4 shows, in flowchart form, a method for generating an incremental patch for updating an old binary image to a new binary image.

Reference is now made to FIG. 4, which shows, in flowchart form, a method 100 for generating an incremental patch for updating an old binary image to a new binary image. The method 100 begins in step 102 by setting an index i to 1. The label current_image refers to the state of the image in flash memory, i.e. the partially patched image, at any given point in time. When the method 100 begins the image in memory is the old binary image, i.e. current_image Is the old binary image.

In step 104, a delta file $\delta$ is computed from the current_image and sector $b_i$ of the new binary image. The delta file $\delta$, or "difference file", is the sector-specific patch $p_i$ used to obtain sector $b_i$ from the current_image. The delta file $\delta$ may be obtained by way of applying a suitable binary difference algorithm. The various binary difference algorithms available will be understood by those of ordinary skill In the art.

In step 106, the index i is checked to determine if the last sector $b_n$ of the new image has been reached. If index i equals n, then the method 100 ends since the full set of sector-based patches $p_1$-$p_n$, i.e. the full incremental patch, has been computed. Otherwise, the method 100 continues at step 108.

In step 108, the sector-specific patch $p_i$ computed in step 104 is applied to the current_image, such that the current_image now reflects the incremental implementation of all patches from $p_1$ to $p_i$. In one embodiment, the newly created patch $p_i$ is used to generate sector $b_i$ which is then written to memory over the current_image. This updated current_image will be used in the next iteration of step 104 to generate the next sector-specific patch. The index i is then incremented in step 110 and the method 100 returns to step 104 to generate the next delta file $\delta$.

The embodiment described above in connection with FIGS. 3A-3D and FIG. 4 generates the sector-specific patches $p_i$ in sequential order beginning with index i=1; however, it will be appreciated that the sector-specific patches $p_i$ may be created in a different order in other embodiments. In some cases, the sequential generation of incremental sector-specific patches $p_i$ beginning with the first sector and going to the nth sector may involve the overwriting of data that would have proven useful in performing sector-specific patches later in the sequence. Accordingly, in one embodiment, the sequence may begin with index i=n and move in decrements to index i=1. In yet another embodiment, the sector-specific patches $p_i$ may be created in any order instead of sequentially.

Figure 5:
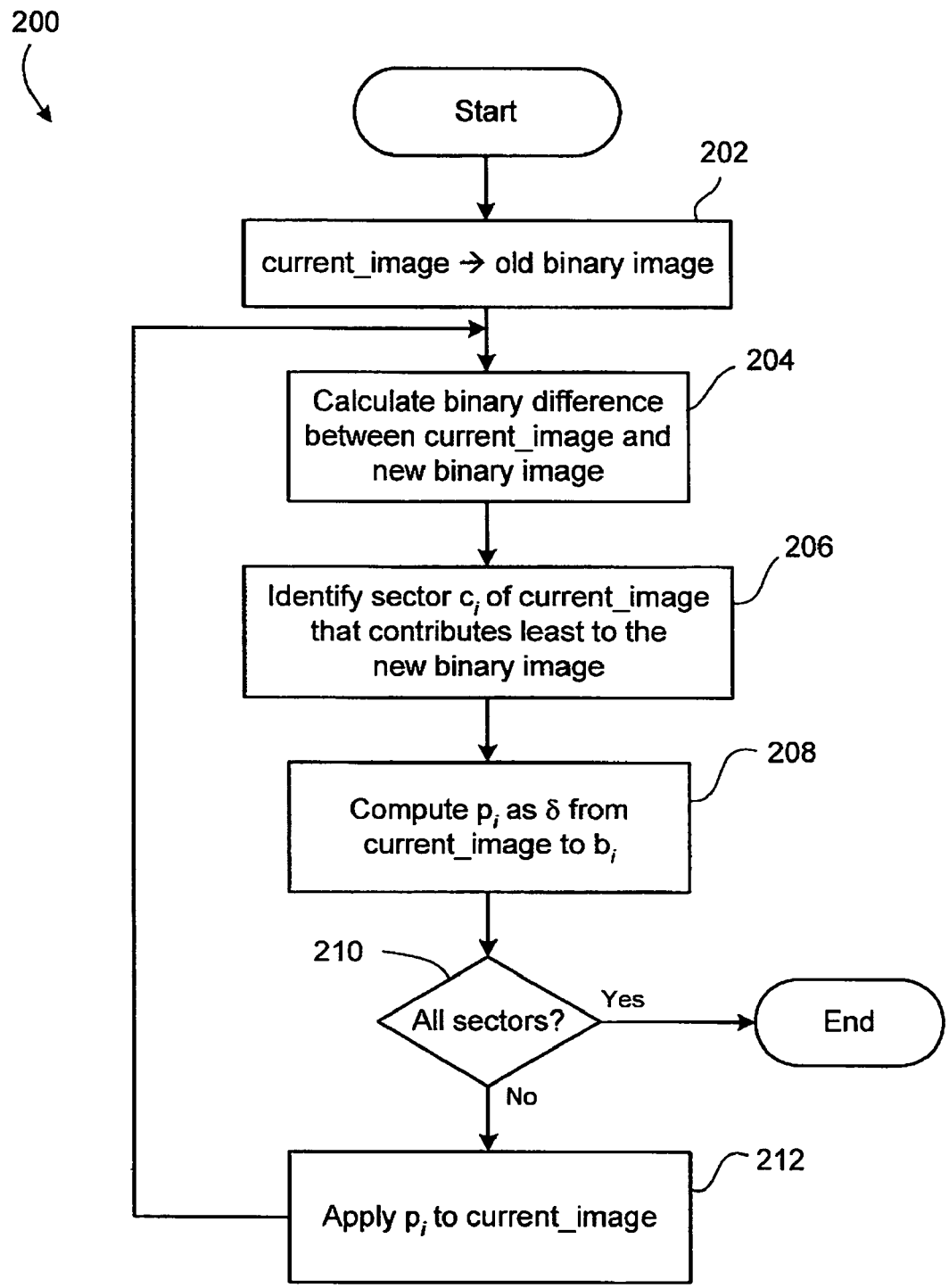
FIG. 5 shows, in flowchart form, another method of generating an incremental patch for updating an old binary image to a new binary image.

In one embodiment, the sector-specific patches $p_i$ may be created in a "least-damage" order. Reference is made to FIG. 5, which shows, in flowchart form, another method 200 of generating an incremental patch for updating an old binary image to a new binary image.

The method 200 begins in step 202. The current_image at this stage of the method 200 is the old binary image. At step 204, a binary difference Is calculated between the current_image and the new binary image. The binary difference between the two images may be calculated using a binary difference algorithm in a manner that will be understood by those of ordinary skill in the art.

At step 206, the results of step 204 are used to determine which sector $c_i$ of the current_image contributes the least to creating the new binary image. For example, in one embodiment, the sector $c_i$ of "least damage" may be identified as the sector having the fewest memory locations referenced in the binary difference file generated in step 204. In other words the sector $c_i$ contributes the least amount of data to the new binary image. A sector that contains no data that is referenced in the binary difference file is a sector of "least damage" since it may be wholly overwritten without losing any later referencing opportunities in performing an incremental patch. To the extent that some referencing opportunities are to be sacrificed by overwriting a portion of the current_image, step 206 attempts to identify the sector $c_i$ whose overwriting will result in the lowest quantity of lost data for referencing opportunities.

As the method 200 moves through iterations, step 204 is reassessed with the current_image, meaning that any sector-specific patches $p_i$ generated in previous iterations have been applied, such that those sectors c of the current_image match the corresponding sectors b of new binary image data. In one embodiment, sectors that have been completed in previous iterations may be explicitly excluded from the "least damage" assessment performed in step 206. In another embodiment, the method 200 may not explicitly exclude these completed sectors from the assessment since they will not be identified as "least damage" sectors due to the fact that they perfectly match the corresponding sectors in the new binary image and therefore appear highly relevant in the binary differencing operation of step 204.

It will be appreciated that any permutation of the sectors can be used to produce a series of patches by using the then-current partially patched image at each step. The choice of sector order does not materially affect the operation of the methods described in the present application. It will also be appreciated that in some instances the sector order that produces the minimal overall patch size may be impractical to find because the search belongs to the set of NP-complete problems. This impracticality is further compounded because each permutation requires a time consuming analysis to produce each incremental patch.

In one embodiment, the patch may be generated by way of a method that is the reverse analogue of the method 200 (FIG. 5). In this embodiment, the sector with the highest contribution is used to generate the "last" incremental patch working backwards to generate the "first" incremental patch.

In yet another embodiment, the patch may be generated by way of a method that starts with a random permutation of sectors. In this embodiment, the method makes changes to the permutation, and keeps the changes that make the total size of patches smaller in size. In one embodiment, this method may employ "simulated annealing" techniques. Simulated annealing starts with large changes to the sequence and progresses to smaller changes until no improvement can be found. Those of ordinary skill in the art will be familiar with the concept of "simulated annealing" for locating good approximations to a global optimum of a given function in a large search space.

Figure 6:
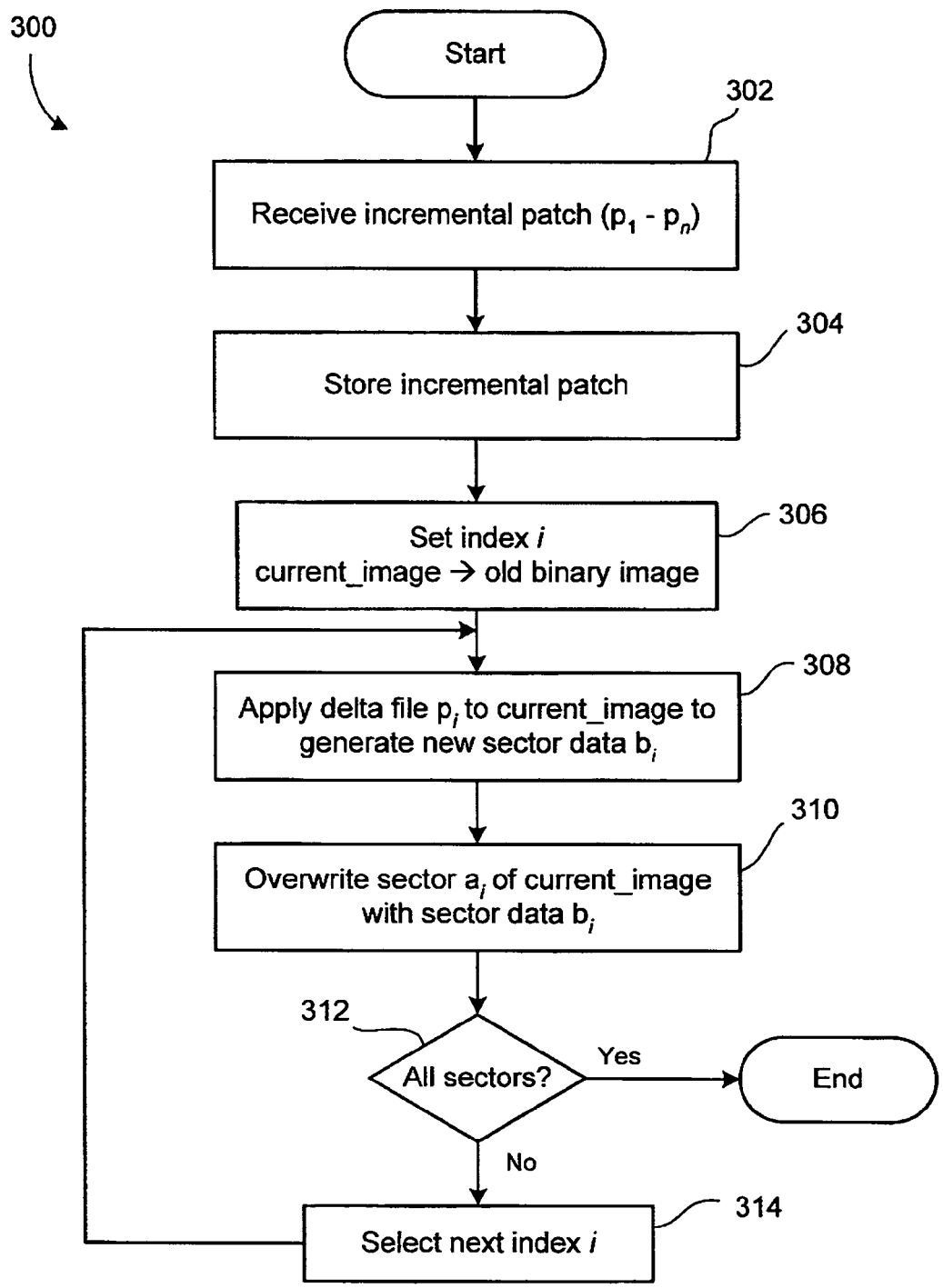
FIG. 6 shows, in flowchart form, a method of incrementally patching a binary image.

Reference is now made to FIG. 6, which shows, in flowchart form, a method 300 of incrementally patching a binary image. The method 300 may be implemented by way of computer program code executable on a processing device. In at least one embodiment, the method 300 is implemented within a mobile electronic device having a flash memory.

The method 300 begins in step 302 with receipt of the incremental patch. In an embodiment involving a mobile electronic device, the incremental patch may be received via wireless communication from a wireless network. In other embodiments, it may be received through a wired connection from a remote source.

The incremental patch is stored in temporary memory in step 304. In one embodiment, the incremental patch may be stored in RAM memory resident on the mobile electronic device.

In step 306, the index i is set to a starting value. The starting value may be specified by the incremental patch. In an embodiment where the patch is intended to be applied sequentially beginning with the first sector of the image and proceeding to the nth sector, the index i may initially be set to 1. However, as noted above, the patch may be intended to be applied to sectors in other orders. The incremental patch may specify an indexing pattern that indicates the order in which the sectors are to be updated using the patch. Accordingly, the Indexing pattern may indicate the starting value for the index i.

The label current_image refers to the state of the binary image, e.g. in flash memory, that is being updated by way of the incremental patch. The current_image may also be referred to as the partially patched image. In step 306, the current_image is the old binary image.

In step 308, delta file p, from the incremental patch, together with the current_image, is used to generate the data for sector $b_i$. In step 310, the data for sector $b_i$ is written over the old data of sector $a_i$. At step 312, the device assesses whether all sectors of the new binary image have been completed and, if so, then the method 300 ends. Otherwise, the method continues in step 314.

In step 314, the next index i is selected. As noted above, the selection of the next index i may be made in accordance with an indexing pattern specified in the incremental patch. The method 300 then returns to step 308 to repeat steps 308 and 310 with the next index i.

Figure 7:
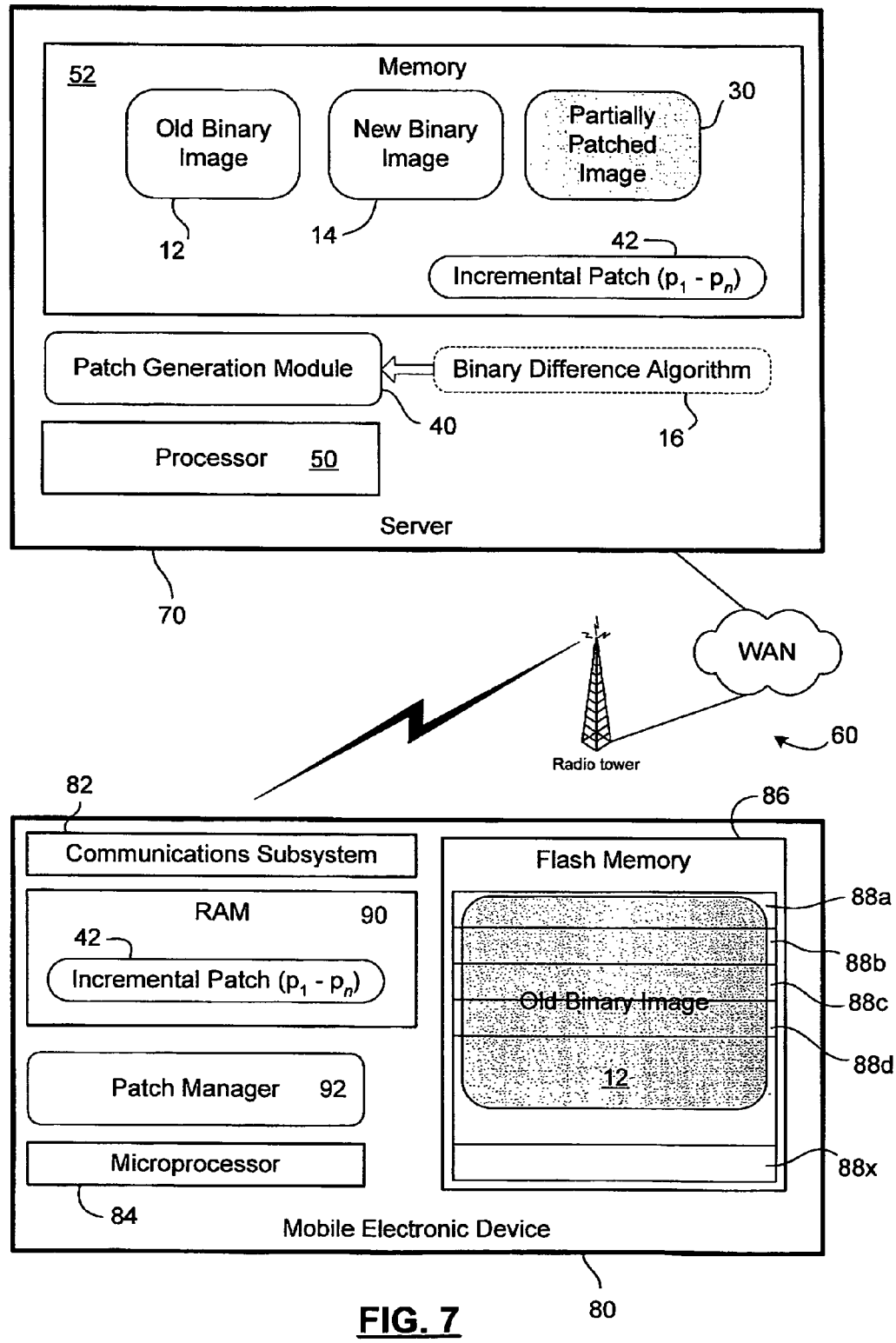
FIG. 7 shows, in block diagram form, a system and device for generating and applying an incremental patch.

Reference is now made to FIG. 7, which shows, in block diagram form, a host 70 and a mobile electronic device 80 for generating and applying an incremental patch 42.

The host 70 may include a processor 50 and memory 52. The host 70 may, in some embodiments, include a server or gateway or other remote computing device. The memory 52 may store a copy of the old binary image 12 and the new binary image 14. The host 70 includes a patch generation module 40 for generating the incremental patch 42, wherein the incremental patch 42 includes sector-specific delta files $p_1$ to $p_n$. The patch generation module 40 includes software components for implementing an embodiment of the patch generation method 200 described above in connection with FIG. 5. The patch generation module 40 and its components employ the binary difference algorithm 16 in the course of generating the delta files, as described above. The memory 52 may further store the partially patched image 30 used by the patch generation module 40 in the course of generating the incremental patch 42.

The host 70 may include a number of other components, both of software and hardware, including an operating system and user interface, as will be appreciated by persons of ordinary skill in the art.

The mobile electronic device 80 may include a microprocessor 84, flash memory 86, RAM 90, and a communications subsystem 82. The communications subsystem 82, operating under program control executed by the microprocessor 84, may provide the device 80 with wireless connectivity using known wireless protocols. The communications subsystem 82 may allow the device 80 to communicate with servers and other devices over a wireless network 60. In some embodiments, the host 70 may transmit or forward files, such as the incremental patch 42 to the device 80 via the wireless network 60. The wireless network 60 may include a plurality of wireless transceivers networked through a wide area network, and may include connections with a plurality of other networks, both public and private, including the Internet.

The mobile electronic device 80 further includes a patch manager 92. The patch manager 92 includes computer-readable code executable by the microprocessor 84 for updating a binary image using the incremental patch 42. The patch manager 92 may, in some embodiments, be provided as a part of the incremental patch 42, although for ease of illustration it is shown as being separate in FIG. 7. The patch manager 92 may be received by the device 80 from the host 70 via the wireless network 60. In another embodiment, the patch manager 92 may be a resident module on the device 80. In some embodiments, the patch manager 92 may be implemented as a part of the device operating system (not shown). In any case, the patch manager 92 implements the commands of the incremental patch 42 for updating the binary image stored In flash memory 86.

The flash memory 86 is divided into sectors 88 (labeled individually 88a to 88x), wherein the sectors 88 are writeable blocks of memory. The old binary image 12 is stored in a range of the sectors 88 in flash memory 86. In accordance with the method 300 described in connection with FIG. 6, the patch manager 92 employs the incremental patch 42 to incrementally generate the data for the new binary image 14 (FIG. 2) and overwrite the old binary image data on a sector-by-sector basis, relying in each iteration upon the then-prevailing partially patched image in flash memory 86 as the basis for generating the next sector of new binary image data.

The present application describes various software components, modules, object, programs or other machine-readable code elements, and the execution of those software components by a suitable processor. The programming of such software components will be within the understanding of a person of ordinary skill in the art having regard to the detailed description herein.

Certain adaptations and modifications of the described embodiments can be made. Therefore, the above discussed embodiments are considered to be illustrative and not restrictive.

What is claimed is:

1. A method of generating an incremental patch for updating an old binary image to a new binary image, the new binary image being divided into a plurality of sectors, the method comprising the steps of:
    initially establishing a current image as the old binary image;
    selecting one of the plurality of sectors of the new binary image;
    computing a binary difference algorithm to generate a delta file for reproducing said one of the plurality of sectors using data from the current image, the delta file being generated based upon the whole of the current image and said selected one of the plurality of sectors of the new binary image;
    applying the delta file to the current image to modify the current image; and
    repeating the steps of selecting, computing and applying for each of the plurality of sectors,
    wherein the incremental patch comprises a plurality of delta files created from the computing steps.

2. The method claimed in claim 1, wherein said step of selecting includes selecting said one of the plurality of sectors that contributes the least amount of data to the new binary image.

3. The method claimed in claim 1, wherein said step of selecting includes calculating a binary difference between the current image and the new binary image, identifying a sector of the current image making the least contribution to the new binary image based on the calculated binary difference, and selecting said one of the plurality of sectors as a sector of the new binary image corresponding to said identified sector of the current image.

4. The method claimed in claim 3, wherein said step of identifying includes identifying a sector of the current image having the fewest memory locations referenced in the calculated binary difference.

5. The method claimed in claim 1, wherein said step of selecting includes determining a sequence of sectors using a simulated annealing technique.

6. The method claimed in claim 1, wherein the current image includes a sector corresponding in location to said one of the plurality of sectors in the new binary image, and wherein said step of applying comprises overwriting the corresponding sector in the current image with new binary image data from said one of the plurality of sectors.

7. The method claimed in claim 1, wherein the sectors comprise writable blocks of flash memory of a predefined size.

8. The method claimed in claim 1, further including steps of aggregating said plurality of delta files to form the incremental patch and transmitting the incremental patch to a mobile electronic device through a wireless network.

9. The method claimed in claim 1, in which the delta file references a portion of the current image for inclusion in said selected one of the plurality of sectors of the new binary image.

10. The method claimed in claim 9, in which the delta file includes a set of copy and insert commands, and wherein the copy commands reference said portion of the current image to be copied into said selected one of the plurality of sectors of the new binary image.

11. A system for generating an incremental patch for updating an old binary image to a new binary image, the new binary image being divided into a plurality of sectors, the system comprising:
    memory for storing the new binary image and the old binary image, and for storing a current image, wherein said current image is initially established as the old binary image;
    a processor;
    a patch generation module executable by the processor for generating the incremental patch, the patch generation module including a component for selecting one of the plurality of sectors of the new binary image, a component for computing a delta file for reproducing said one of the plurality of sectors using data from the current image, the delta file being generated based upon the whole of the current image and the selected one of the plurality of sectors of the new binary image, and a component for applying the delta file to the current image to modify the current image, and wherein said patch generation module includes a loop component for invoking said components for selecting, computing and applying for each of the plurality of sectors,
    wherein said component for computing includes a binary difference algorithm to generate said delta file, and
    wherein the incremental patch comprises a plurality of the delta files created by said component for computing under control of said loop component.

12. The system claimed in claim 11, wherein said component for selecting includes a component for selecting said one of the plurality of sectors that contributes the least amount of data to the new binary image.

13. The system claimed in claim 11, wherein said component for selecting includes a component for calculating a binary difference between the current image and the new binary image, for identifying a sector of the current image making the least contribution to the new binary image based on the calculated binary difference, and for selecting said one of the plurality of sectors as a sector of the new binary image corresponding to said identified sector of the current image.

14. The system claimed in claim 13, wherein said component for identifying includes a component for identifying a sector of the current image having the fewest memory locations referenced in the calculated binary difference.

15. The system claimed in claim 11, wherein said component for selecting includes a component for determining a sequence of sectors using a simulated annealing technique.

16. The system claimed in claim 11, wherein the current image includes a sector corresponding in location to said one of the plurality of sectors in the new binary image, and wherein said component for applying comprises a component for overwriting the corresponding sector in the current image with new binary image data from said one of the plurality of sectors.

17. The system claimed in claim 11, wherein the sectors comprise blocks of flash memory of a predefined size, and wherein each of said blocks of memory comprises a writable block of said flash memory.

18. The system claimed in claim 11, wherein said patch generation module is adapted to aggregate said plurality of delta files to form the incremental patch and wherein said system further includes a wireless network for transmitting the incremental patch to a mobile electronic device.

19. A computer program product comprising a non-transitory computer readable medium having encoded thereon computer-executable instructions for generating an incremental patch for updating an old binary image to a new binary image, the new binary image being divided into a plurality of sectors, the computer executable instructions comprising:
  computer executable instructions for initially establishing a current image as the old binary image;
  computer executable instructions for selecting one of the plurality of sectors of the new binary image;
  computer executable instructions for computing a binary difference algorithm to generate a delta file for reproducing said one of the plurality of sectors using data from the current image, the delta file being generated based upon the whole of the current image and said selected one of the plurality of sectors of the new binary image;
  computer executable instructions for applying the delta file to the current image to modify the current image; and
  computer executable instructions for repeating the steps of computing and applying for each of the plurality of sectors,
  wherein the incremental patch comprises a plurality of delta files created from the computing steps.

20. The computer program product claimed in claim 19, wherein said computer executable instructions for selecting include computer executable instructions for selecting said one of the plurality of sectors that contributes the least amount of data to the new binary image.

21. The computer program product claimed in claim 19, wherein said computer executable instructions for selecting include computer executable instructions for calculating a binary difference between the current image and the new binary image, identifying a sector of the current image making the least contribution to the new binary image based on the calculated binary difference, and selecting said one of the plurality of sectors as a sector of the new binary image corresponding to said identified sector of the current image.

22. The computer program product claimed in claim 21, wherein said computer executable instructions for identifying include computer executable instructions for identifying a sector of the current image having the fewest memory locations referenced in the calculated binary difference.

23. The computer program product claimed in claim 19, wherein said computer executable instructions for selecting include computer executable instructions for determining a sequence of sectors using a simulated annealing technique.

24. The computer program product claimed in claim 19, wherein the current image includes a sector corresponding in location to said one of the plurality of sectors in the new binary image, and wherein said computer executable instructions for applying comprise computer executable instructions for overwriting the corresponding sector in the current image with new binary image data from said one of the plurality of sectors.

* * * * *